United States Patent
Mayo et al.

(10) Patent No.: US 9,146,004 B2
(45) Date of Patent: *Sep. 29, 2015

(54) CABIN AIR COMPRESSOR SUPPORT BRACKET

(71) Applicant: Hamilton Sundstrand Corporation, Windsor Locks, CT (US)

(72) Inventors: Luke J. Mayo, Coventry, CT (US); Alpesh Patel, Simsbury, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 8 days.

This patent is subject to a terminal disclaimer.

(21) Appl. No.: 13/901,811

(22) Filed: May 24, 2013

(65) Prior Publication Data
US 2014/0346315 A1    Nov. 27, 2014

(51) Int. Cl.
A47F 5/00      (2006.01)
F16M 13/02    (2006.01)
B60H 1/00     (2006.01)
B64D 13/02    (2006.01)

(52) U.S. Cl.
CPC ........... *F16M 13/02* (2013.01); *B60H 1/00535* (2013.01); *B64D 13/02* (2013.01); *Y10T 29/49826* (2015.01)

(58) Field of Classification Search
CPC ............. F16M 7/00; F16M 9/00; F16M 3/00; F16M 13/02; B64D 13/02
USPC ............ 248/674, 637, 205.1, 220.21, 220.22, 248/223.31, 225.11, 309.1; 244/54
See application file for complete search history.

(56) References Cited

U.S. PATENT DOCUMENTS

| | | | |
|---|---|---|---|
| 2,883,135 A | | 4/1959 | Smalley |
| 5,439,189 A | * | 8/1995 | Wiley et al. ...................... 244/54 |
| 5,954,309 A | * | 9/1999 | Kato et al. .................... 248/636 |
| 6,270,051 B1 | * | 8/2001 | Power ........................... 248/638 |
| 7,134,252 B2 | * | 11/2006 | Thompson ...................... 52/712 |
| 7,516,621 B2 | * | 4/2009 | Suttie et al. ...................... 60/796 |
| 7,637,521 B2 | * | 12/2009 | Grant ........................... 280/279 |
| 7,810,295 B2 | * | 10/2010 | Thompson ...................... 52/511 |
| 7,909,286 B2 | * | 3/2011 | Martinez Rueda et al. ..... 244/58 |
| 8,028,671 B1 | * | 10/2011 | Grozich .................... 123/195 A |
| 8,813,457 B2 | * | 8/2014 | Underkofler et al. ........... 52/712 |
| 8,979,056 B2 | * | 3/2015 | Mayo et al. ................ 248/309.1 |
| 2010/0044540 A1 | | 2/2010 | Knudsen et al. |
| 2014/0151518 A1 | * | 6/2014 | Vignali et al. ............. 248/219.4 |

* cited by examiner

Primary Examiner — Todd M Epps
(74) Attorney, Agent, or Firm — Cantor & Colburn LLP (57) ABSTRACT

A support bracket for a cabin air compressor (CAC) assembly includes a CAC mounting portion formed substantially orthogonal to an access portion and a structural support portion. A cross-support bracket mounting portion is formed at an angle relative to the access portion. An upper lug portion is formed at an angle relative to the access portion and substantially orthogonal to an upper lug. A plurality of CAC mounting holes is formed in the CAC mounting portion. The CAC mounting holes are distributed in an arc configuration along a CAC mounting hole circle radius. A plurality of lower slotted holes and an upper slotted hole are formed in the cross-support bracket mounting portion. A ratio of the CAC mounting hole circle radius to a length defined between the lower slotted holes and the upper slotted hole is between 5.93 and 6.25.

16 Claims, 6 Drawing Sheets

CABIN AIR COMPRESSOR SUPPORT BRACKET

BACKGROUND OF THE INVENTION

The subject matter disclosed herein relates to aircraft environmental control. More specifically, the subject disclosure relates to a support bracket of a cabin air compressor for an aircraft environmental control system.

Environmental control systems (ECSs) are utilized on various types of aircraft for several purposes, such as in cooling systems for the aircraft. For example, components of an ECS may be utilized to remove heat from various aircraft lubrication and electrical systems and/or used to condition aircraft cabin air. A cabin air conditioning and temperature control system (CACTCS) is an example of an aircraft ECS that includes air cycle packs supplied with pressurized outside (fresh) air from electric motor-driven cabin air compressors (CACs) which condition fresh air for cabin heating and cooling. The CACTCS provides flow control for modulation of cooling pack air flow, recirculation fans to circulate cabin air, and associated valves and sensors used for system control.

The CACTCS may also include a trim air system to provide individual cabin zone temperature control. This includes trim temperature control valves, trim duct heaters and associated sensors. As one example, a CACTCS may provide control of six baseline passenger zones and a flight deck zone. Additional zones, such as a forward cargo zone, a crew zone and/or an attendant zone may be controlled by other ECSs. Recirculation fans may also be provided for additional air flow to the passenger cabin and to ensure that flow at an air distribution nozzle remains constant.

Various elements of aircraft ECSs can experience harsh environments including a wide range of temperatures, pressures, and vibrations. Elements of aircraft ECSs must also fit within a compact space and minimize weight while providing adequate strength to handle typical and peak stresses over the anticipated life of the elements.

BRIEF DESCRIPTION OF THE INVENTION

According to one aspect, a support bracket for a cabin air compressor assembly is provided. The support bracket includes a cabin air compressor mounting portion formed substantially orthogonal to an access portion and a structural support portion. A cross-support bracket mounting portion is formed at an angle relative to the access portion. An upper lug portion is formed at an angle relative to the access portion and substantially orthogonal to an upper lug. A plurality of cabin air compressor mounting holes is formed in the cabin air compressor mounting portion. The cabin air compressor mounting holes are distributed in an arc configuration along a cabin air compressor mounting hole circle radius. A plurality of lower slotted holes and an upper slotted hole are formed in the cross-support bracket mounting portion. A ratio of the cabin air compressor mounting hole circle radius to a length defined between the lower slotted holes and the upper slotted hole is between 5.93 and 6.25.

According to another aspect, a cabin air compressor support assembly is provided. The cabin air compressor support assembly includes a right-hand cabin air compressor support bracket coupled to a cabin air compressor assembly, a cross-support bracket, and a lower three-way mount. The cabin air compressor support assembly also includes a left-hand cabin air compressor support bracket coupled to the cabin air compressor assembly, the cross-support bracket, and an upper three-way mount. The left-hand cabin air compressor support bracket includes a cabin air compressor mounting portion formed substantially orthogonal to an access portion and a structural support portion. A cross-support bracket mounting portion is formed at an angle relative to the access portion. An upper lug portion is formed at an angle relative to the access portion and substantially orthogonal to an upper lug. A plurality of cabin air compressor mounting holes is formed in the cabin air compressor mounting portion. The cabin air compressor mounting holes are distributed in an arc configuration along a cabin air compressor mounting hole circle radius. A plurality of lower slotted holes and an upper slotted hole are formed in the cross-support bracket mounting portion. A ratio of the cabin air compressor mounting hole circle radius to a length defined between the lower slotted holes and the upper slotted hole is between 5.93 and 6.25.

According to a further aspect, a method of installing a support bracket in a cabin air conditioning and temperature control system is provided. An upper lug of the support bracket is coupled to a mount of the cabin air conditioning and temperature control system. A cabin air compressor mounting portion of the support bracket is coupled to a cabin air compressor assembly of the cabin air conditioning and temperature control system. A cross-support bracket mounting portion of the support bracket is coupled to a cross-support bracket. The support bracket includes the cabin air compressor mounting portion formed substantially orthogonal to an access portion and a structural support portion. The cross-support bracket mounting portion is formed at an angle relative to the access portion. An upper lug portion is formed at an angle relative to the access portion and substantially orthogonal to the upper lug. A plurality of cabin air compressor mounting holes is formed in the cabin air compressor mounting portion. The cabin air compressor mounting holes are distributed in an arc configuration along a cabin air compressor mounting hole circle radius. A plurality of lower slotted holes and an upper slotted hole are formed in the cross-support bracket mounting portion. A ratio of the cabin air compressor mounting hole circle radius to a length defined between the lower slotted holes and the upper slotted hole is between 5.93 and 6.25.

DETAILED DESCRIPTION OF THE INVENTION

Figure 1:
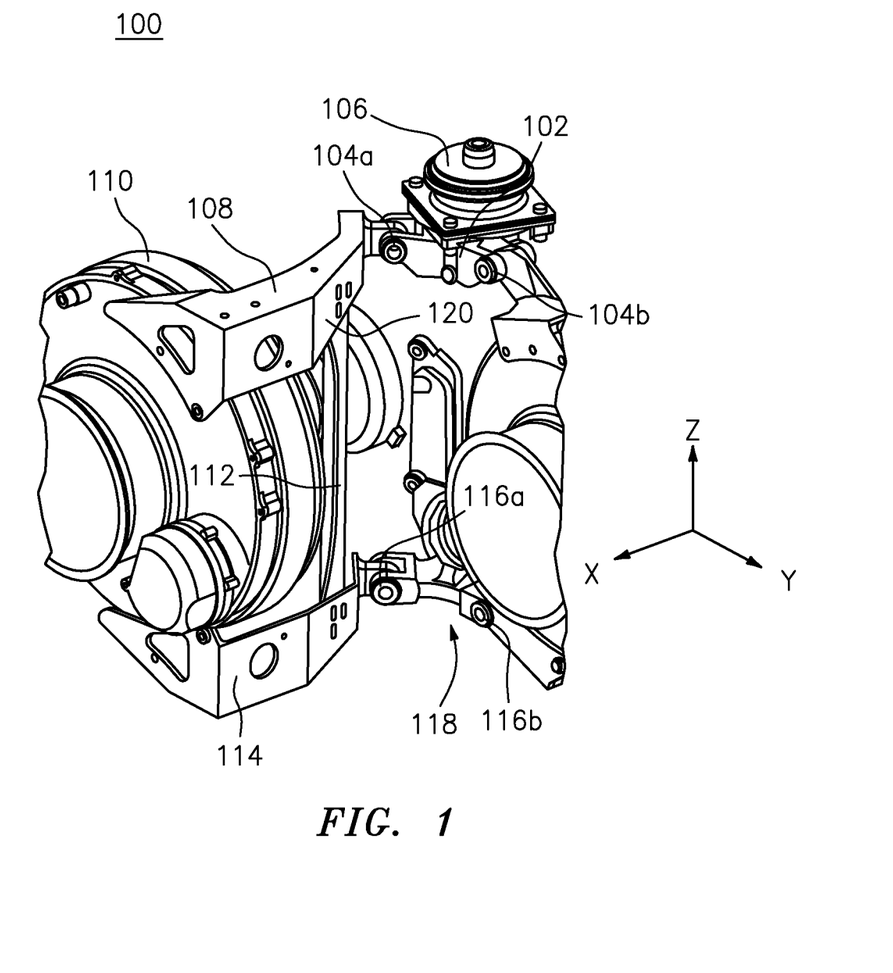
FIG. 1 is a partial perspective view of a cabin air conditioning and temperature control system.
Figure 2:
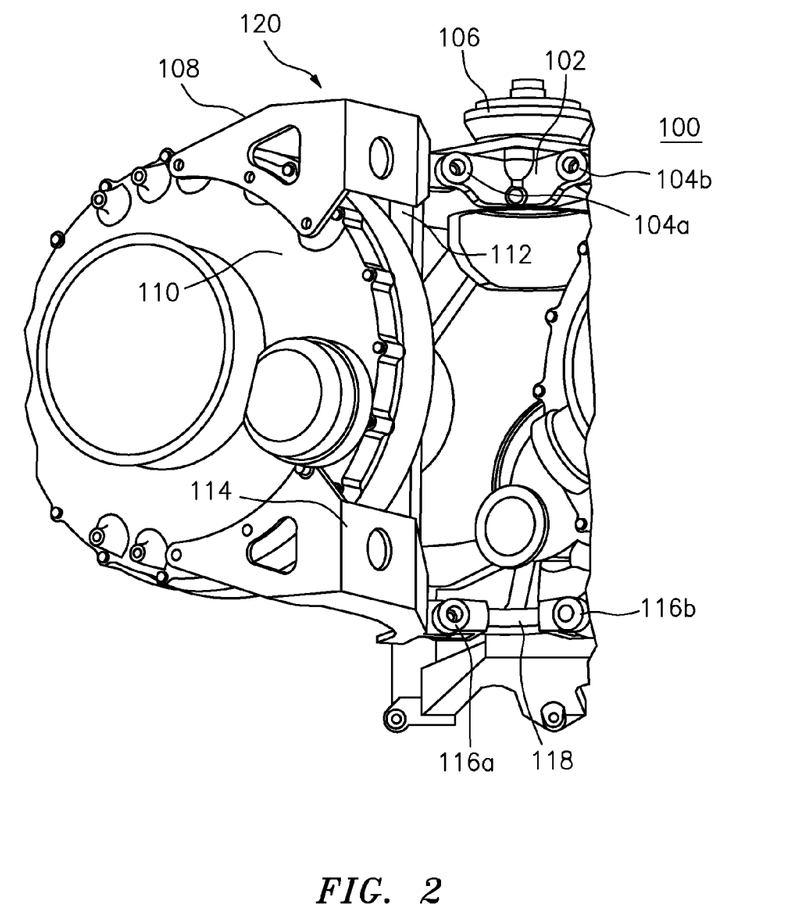
FIG. 2 is another partial perspective view of the cabin air conditioning and temperature control system of FIG. 1.

Shown in FIGS. 1 and 2 are partial perspective views of a cabin air conditioning and temperature control system (CACTCS) 100. The CACTCS 100 includes an upper three-way mount 102 with coupling points 104a and 104b. The upper three-way mount 102 may also be coupled to one or more vibration isolators 106. The coupling point 104a is coupled to a first cabin air compressor (CAC) support bracket 108. The first CAC support bracket 108 is coupled to a CAC 110 and a cross-support bracket 112. The cross-support bracket 112 is coupled to a second CAC support bracket 114. The second CAC support bracket 114 is coupled to the CAC 110 and a coupling point 116a of a lower three-way mount 118 as best viewed in FIG. 2. Similar to the upper three-way mount 102, the lower three-way mount 118 includes a pair of coupling points 116a and 116b. The first CAC support bracket 108, the cross-support bracket 112, and the second CAC support bracket 114 collectively form a CAC support assembly 120. The first CAC support bracket 108 may also be referred to as a left-hand CAC support bracket, and the second CAC support bracket 114 may be referred to as a right-hand CAC support bracket. The coupling points 104b and 116b may be used to support a second CAC (not depicted), where the CAC 110 may be referred to as an outer CAC and the second CAC (not depicted) may be referred to as an inner CAC. The three-way mounts 102 and 118 limit CAC movement in three directions (X-Y-Z).

Figure 3:
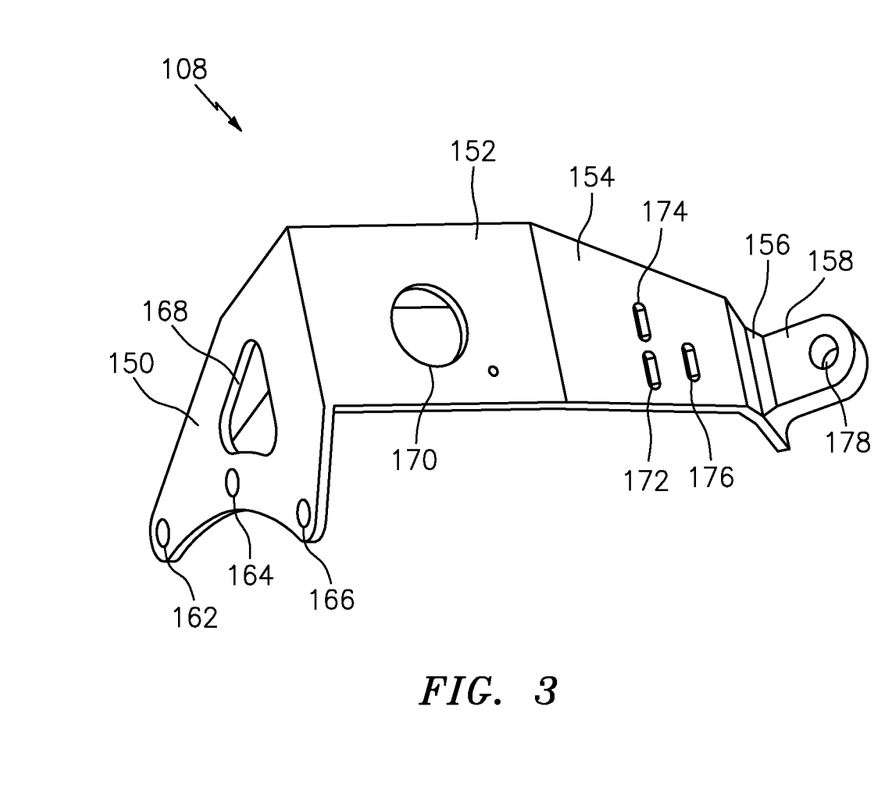
FIG. 3 is a perspective view of a cabin air compressor support bracket.

FIG. 3 is a perspective view of the first CAC support bracket 108 of FIGS. 1 and 2. The first CAC support bracket 108 includes a CAC mounting portion 150, an access portion 152, a cross-support bracket mounting portion 154, an upper lug portion 156, and an upper lug 158. The first CAC support bracket 108 also includes a structural support portion 160 as best viewed in FIG. 4. The CAC mounting portion 150 includes a first CAC mounting hole 162, a second CAC mounting hole 164, and a third CAC mounting hole 166 distributed in an arc configuration. The CAC mounting holes 162 and 166 are also referred to as the outermost CAC mounting holes 162 and 166 relative to the CAC mounting hole 164. The CAC mounting portion 150 also includes a substantially triangular shaped lightening region 168. The access portion 152 includes a substantially circular access aperture 170. The cross-support bracket mounting portion 154 includes three slotted holes 172, 174, and 176, which are also referred to as lower slotted holes 172,174 and upper slotted hole 176. The upper lug 158 includes a coupling hole 178.

Figure 4:
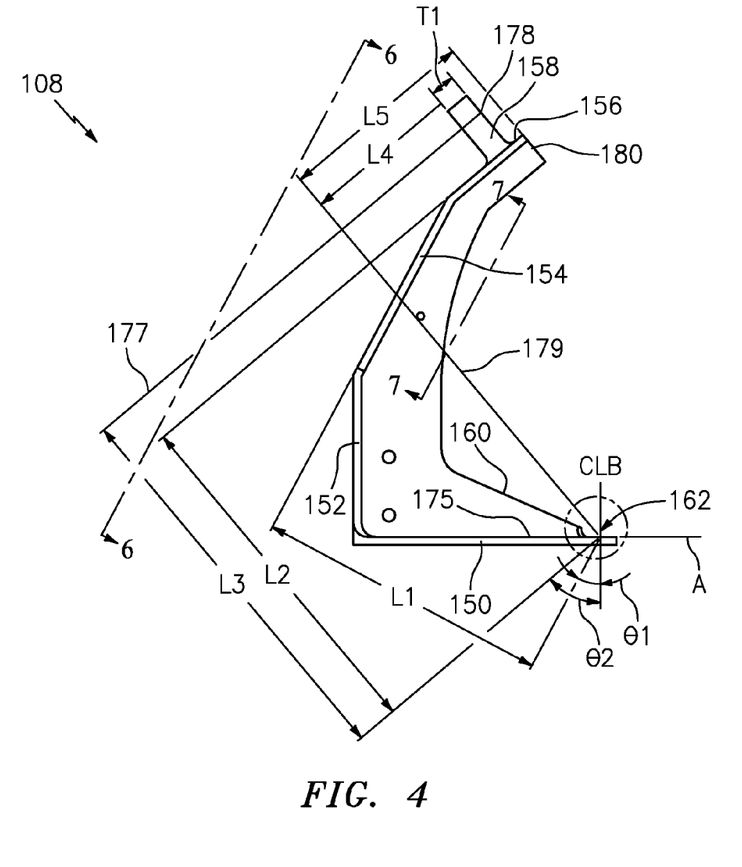
FIG. 4 is another view of the cabin air compressor support bracket of FIG. 3.

The CAC mounting portion 150 is formed substantially orthogonal to the access portion 152 and the structural support portion 160 of FIG. 4. The cross-support bracket mounting portion 154 is formed at an angle relative to the access portion 152, and the upper lug portion 156 is formed at an angle relative to the access portion 152. The upper lug 158 is formed substantially orthogonal to the upper lug portion 156.

The CAC mounting holes 162-166 are configured to mate the first CAC support bracket 108 to the CAC 110 of FIG. 1. The slotted holes 172-176 are configured to mate the first CAC support bracket 108 with the cross-support bracket 112 of FIG. 1. The coupling hole 178 is configured to mate the first CAC support bracket 108 with the coupling point 104a of FIG. 1. Various fastener apparatuses (not depicted), such as bolts, can be used to perform mating of various components.

FIG. 4 is another view of the CAC support bracket 108 depicting the structural support portion 160 and side views of the CAC mounting portion 150, the access portion 152, the cross-support bracket mounting portion 154, the upper lug portion 156, and the upper lug 158. A datum A defines a reference on the CAC mounting portion 150, and centerline B (CLB) defines a centerline through CAC mounting hole 162. Datum A is defined on a CAC side 175 of the CAC mounting portion 150 that is in closer proximity to the CAC 110 upon coupling the CAC support bracket 108 to the CAC 110. A first angle (θ1) of about 28 degrees is defined between CLB and the cross-support bracket mounting portion 154 at a length L1 of about 9.95 inches (25.273 cm) from CLB at datum A to the cross-support bracket mounting portion 154. A second angle (θ2) of about 50 degrees is defined between CLB and the upper lug portion 156 at a length L2 of about 12.115 inches (30.772 cm) from CLB at datum A to the upper lug portion 156. The second angle θ2 is also defined between CLB and a central axis 177 of the coupling hole 178 at a length L3 of about 13.608 inches (34.564 cm) from CLB at datum A to the central axis 177 of the coupling hole 178. A length L4 of about 5.324 inches (13.523 cm) is defined from a projection 179 normal to CLB at datum A to the upper lug 158. A length L5 of about 6.755 inches (17.158 cm) is defined from the projection 179 normal to CLB at datum A to an upper end 180 that is substantially orthogonal to the upper lug portion 156. The upper lug 158 has a thickness T1 of about 0.815 inches (2.070 cm).

Figure 5:
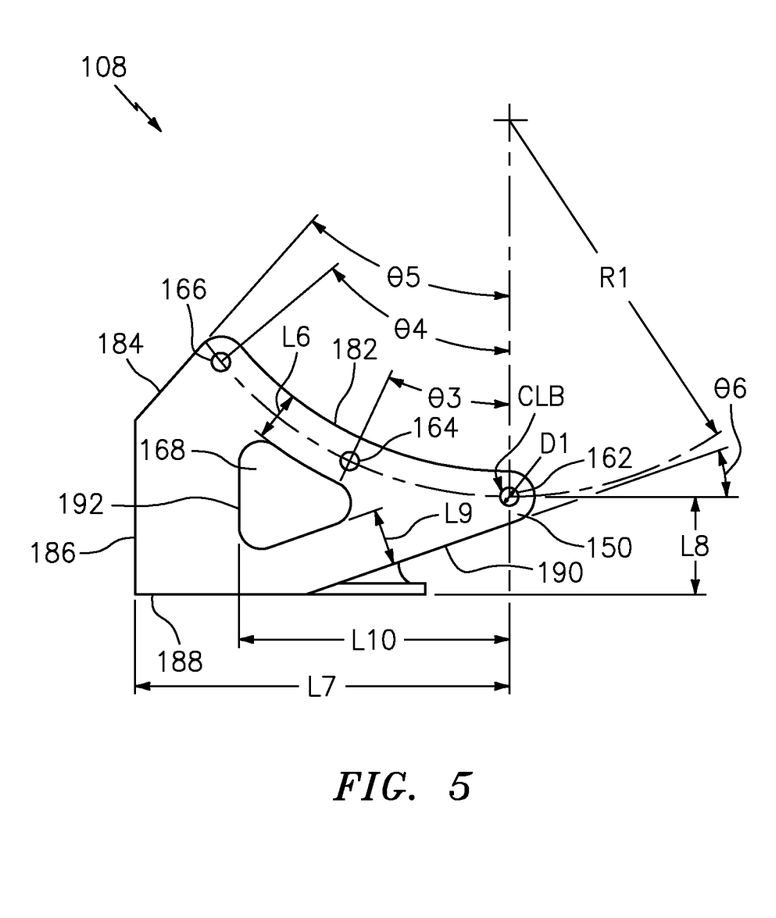
FIG. 5 is a detailed view of a cabin air compressor mounting portion of the cabin air compressor support bracket of FIG. 3.

FIG. 5 is a detailed view of the CAC mounting portion 150 of the CAC support bracket 108. The CAC mounting holes 162, 164, and 166, each having a diameter D1 of about 0.406 inches (1.031 cm), are distributed in an arc configuration along a CAC mounting hole circle radius R1 of about 8.375 inches (21.273 cm) positioned between a curved edge 182 of the CAC mounting portion 150 and the substantially triangular shaped lightening region 168. A length L6 of about 1.125 inches (2.858 cm) separates the curved edge 182 of the CAC mounting portion 150 and the substantially triangular shaped lightening region 168. Relative to CLB, CAC mounting hole 164 is offset by an angle θ3 of about 25 degrees and CAC mounting hole 166 is offset by an angle θ4 of about 50 degrees at the CAC mounting hole circle radius R1. A first angled edge 184 proximate the CAC mounting hole 166 is offset by an angle θ5 of about 41.61 degrees relative to CLB. The first angled edge 184 is formed between the curved edge 182 and an outer edge 186 of the CAC mounting portion 150. A length L7 of about 8.325 inches (21.146 cm) is defined between the outer edge 186 and CLB. The outer edge 186 is substantially normal to a lower edge 188 of the CAC mounting portion 150. A length L8 of about 2.225 inches (5.652 cm) is defined between the lower edge 188 and CLB.

A second angled edge 190 is formed between the lower edge 188 and the curved edge 182 of the CAC mounting portion 150 at an angle θ6 of about 19.6 degrees relative to the lower edge 188. A length L9 of about 1.24 inches (3.150 cm) separates the second angled edge 190 of the CAC mounting portion 150 and the substantially triangular shaped lightening region 168. An edge 192 of the substantially triangular shaped lightening region 168 is positioned at a length L10 of about 6 inches (15.24 cm), where the edge 192 is substantially parallel to the outer edge 186.

Figures 6, 7:
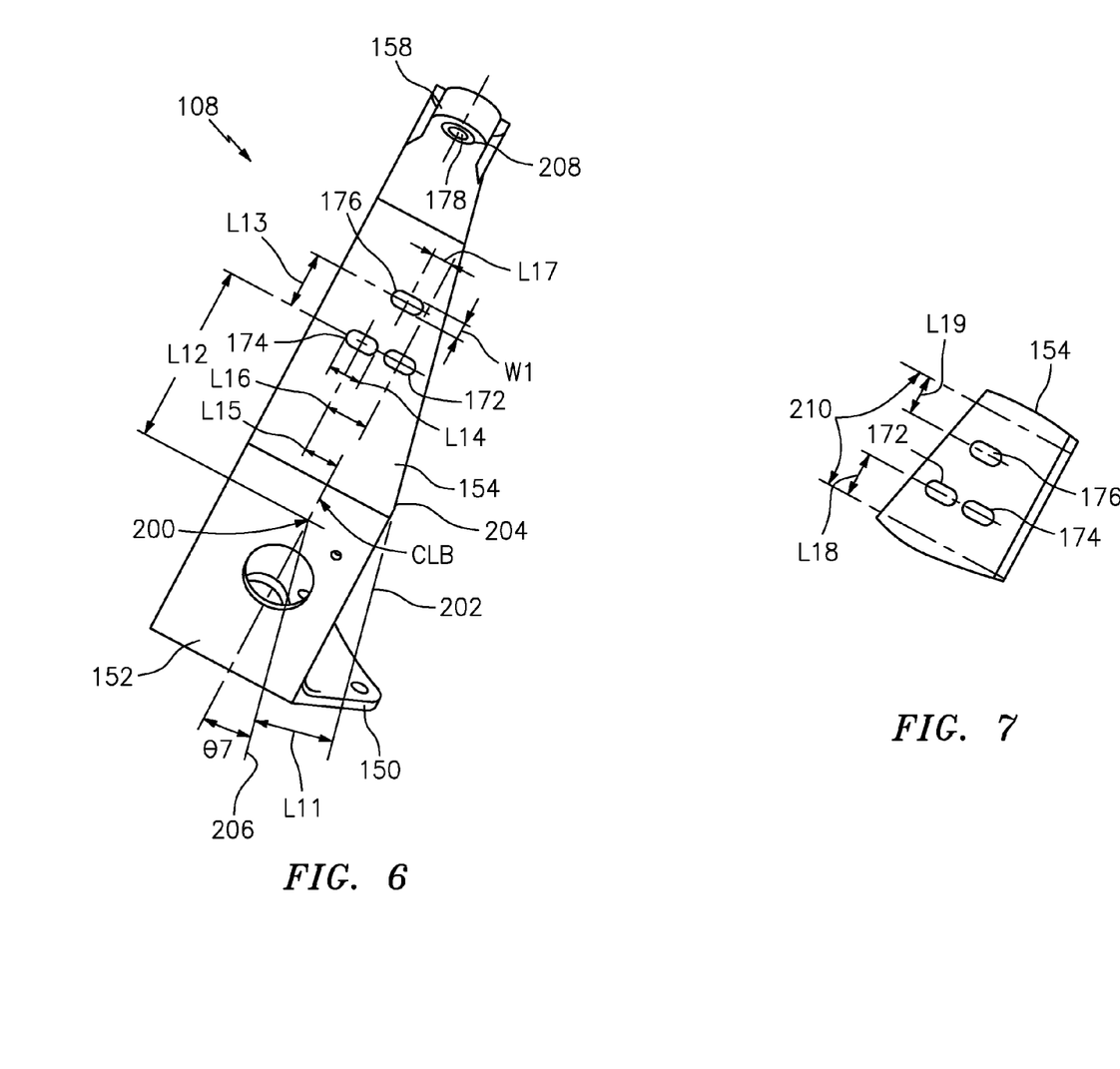
FIG. 6 is another view of the cabin air compressor support bracket of FIG. 3.
FIG. 7 is detailed view of a portion of a cross-support bracket mounting portion of the cabin air compressor support bracket of FIG. 3.

FIG. 6 is another view of the CAC support bracket 108 according to an embodiment as taken at section line 6 of FIG. 4. A reference point 200 is defined as the intersection of CLB and datum A of FIG. 4 based on the orientation of the CAC support bracket 108 in FIG. 6. The reference point 200 may be located based on a projection 202 of an angled edge 204 of the cross-support bracket mounting portion 154. A reference line 206 is defined at a length L11 of about 1.915 inches (4.864 cm) from the projection 202, where the reference line 206 extends to the reference point 200 and forms an angle θ7 of about 13 degrees relative to CLB. The lower slotted holes 172 and 174 are offset by a length L12 of about 4.423 inches (11.234 cm) from the reference point 200. The upper slotted hole 176 is offset by a length L13 of about 1.375 inches (3.493 cm) from the lower slotted holes 172 and 174. Each of the slotted holes 172-176 has a length L14 of about 0.8 inches (2.032 cm) and a width W1 of about 0.413 inches (1.049 cm). The slotted hole 174 is offset by a length L15 of about 1.025 inches (2.604 cm) from CLB. The slotted hole 172 is offset by a length L16 of about 0.898 inches (2.281 cm) from the slotted hole 174. The slotted hole 176 is offset by a length L17 of about 0.513 inches (1.303 cm) from the slotted hole 172.

The view of the CAC support bracket 108 in FIG. 6 also depicts a bushing 208 installed in the coupling hole 178 of the upper lug 158. The bushing 208 provides a bearing portion for a fastener (not depicted) to engage with the coupling point 104a of FIG. 1.

FIG. 7 is detailed view of a portion of the cross-support bracket mounting portion 154 of the CAC support bracket 108 according to an embodiment as taken at section line 7 of FIG. 4. Substantially smooth regions 210 are defined relative to the slotted holes 172, 174, and 176. For example, the substantially smooth regions 210 may be free of cusps associated with tooling used to manufacture the CAC support bracket 108. The substantially smooth regions 210 may be defined as extending a minimum length L18 of about 1.1 inches (2.794 cm) below the slotted holes 172 and 174, and a minimum length L19 of about 0.975 inches (2.477 cm) above the slotted hole 176.

A number of ratios are defined between elements of the CAC support bracket 108 as depicted in FIGS. 1-7. In an embodiment, a ratio of the CAC mounting hole circle radius R1 to the length L13 between the lower slotted holes 172, 174 and the upper slotted hole 176 is between 5.93 and 6.25. A ratio of the CAC mounting hole circle radius R1 to the minimum length L19 above the slotted hole 176 of the substantially smooth regions 210 is at most 8.375:0.975. A ratio of the CAC mounting hole circle radius R1 to the diameter D1 of the CAC mounting holes 162, 164, and 166 is between 20 and 21.23. A ratio of the angle θ4 defined between the outermost CAC mounting holes 162 and 166 at the CAC mounting hole circle radius R1 to the angle θ6 defined between the lower edge 188 and the second angled edge 190 is between 2.46 and 2.65. A ratio of the length L3 from CLB at datum A to the central axis 177 of the coupling hole 178 to the CAC mounting hole circle radius R1 is between 1.618 and 1.632. A ratio of the CAC mounting hole circle radius R1 to the length L4 defined from the projection 179 normal to CLB at datum A to the upper lug portion 156 is between 1.558 and 1.588.

A process of installing the CAC support bracket 108 in the cabin air conditioning and temperature control system 100 is described in reference to FIGS. 1-7. The upper lug 158 of the CAC support bracket 108 is coupled to the coupling point 104a of the upper three-way mount 102. The CAC mounting portion 150 of the CAC support bracket 108 is coupled to the CAC 110. The cross-support bracket mounting portion 154 of the CAC support bracket 108 is coupled to the cross-support bracket 112. The cross-support bracket 112 is also coupled to the second (right-hand) CAC support bracket 114. The second CAC support bracket 114 is coupled to the CAC 110 and to the coupling point 116a of the lower three-way mount 118. As previously described, the CAC support bracket 108 includes the CAC mounting portion 150 formed substantially orthogonal to the access portion 152 and the structural support portion 160, as well as the cross-support bracket mounting portion 154 formed at an angle (e.g., angle θ1) relative to the access portion 152. The upper lug portion 156 is formed at an angle (e.g., angle θ2) relative to the access portion 152 and substantially orthogonal to the upper lug 158. A ratio of the CAC hole circle radius R1 to the length L13 defined between the lower slotted holes 172,174 and the upper slotted hole 176 is between 5.93 and 6.25.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A support bracket for a cabin air compressor assembly, the support bracket comprising:
    a cabin air compressor mounting portion formed substantially orthogonal to an access portion and a structural support portion;
    a cross-support bracket mounting portion formed at an angle relative to the access portion;
    an upper lug portion formed at an angle relative to the access portion and substantially orthogonal to an upper lug;
    a plurality of cabin air compressor mounting holes in the cabin air compressor mounting portion, the cabin air compressor mounting holes distributed in an arc configuration along a cabin air compressor mounting hole circle radius; and
    a plurality of lower slotted holes and an upper slotted hole in the cross-support bracket mounting portion, wherein a ratio of the cabin air compressor mounting hole circle radius to a length defined between the lower slotted holes and the upper slotted hole is between 5.93 and 6.25.

2. The support bracket of claim 1, wherein substantially smooth regions are formed above the upper slotted hole in the cross-support bracket mounting portion and below the lower slotted holes in the cross-support bracket mounting portion, and a ratio of the cabin air compressor mounting hole circle radius to a length above the upper slotted hole of the substantially smooth regions is at most 8.375:0.975.

3. The support bracket of claim 1, wherein a ratio of the cabin air compressor mounting hole circle radius to a diameter of each of the cabin air compressor mounting holes is between 20 and 21.23.

4. The support bracket of claim 1, wherein the cabin air compressor mounting holes further comprise a first cabin air compressor mounting hole, a second cabin air compressor mounting hole, and a third cabin air compressor mounting hole, and the cabin air compressor mounting portion further comprises a curved edge proximate the cabin air compressor mounting holes, a first angled edge proximate the third cabin air compressor mounting hole and formed between the curved edge and an outer edge of the cabin air compressor mounting portion, a lower edge substantially normal to the outer edge, and a second angled edge proximate to the first cabin air compressor mounting hole and formed between the lower edge and the curved edge.

5. The support bracket of claim 4, wherein a ratio of an angle defined between the first cabin air compressor mounting hole and the third cabin air compressor mounting hole at the cabin air compressor mounting hole circle radius to an angle defined between the lower edge and the second angled edge is between 2.46 and 2.65.

6. The support bracket of claim 4, wherein a centerline is defined through the first cabin air compressor mounting hole, a datum is defined on a cabin air compressor side of the cabin air compressor mounting portion, and a ratio of a length from the centerline at the datum to a central axis of a coupling hole of the upper lug relative to the cabin air compressor mounting hole circle radius is between 1.618 and 1.632.

7. The support bracket of claim 6, wherein a ratio of the cabin air compressor mounting hole circle radius to a length defined from a projection normal to the centerline at the datum to the upper lug portion is between 1.558 and 1.588.

8. A cabin air compressor support assembly comprising:
a right-hand cabin air compressor support bracket coupled to a cabin air compressor assembly, a cross-support bracket, and a lower three-way mount; and
a left-hand cabin air compressor support bracket coupled to the cabin air compressor assembly, the cross-support bracket, and an upper three-way mount, the left-hand cabin air compressor support bracket comprising:
a cabin air compressor mounting portion formed substantially orthogonal to an access portion and a structural support portion;
a cross-support bracket mounting portion formed at an angle relative to the access portion;
an upper lug portion formed at an angle relative to the access portion and substantially orthogonal to an upper lug;
a plurality of cabin air compressor mounting holes in the cabin air compressor mounting portion, the cabin air compressor mounting holes distributed in an arc configuration along a cabin air compressor mounting hole circle radius; and
a plurality of lower slotted holes and an upper slotted hole in the cross-support bracket mounting portion, wherein a ratio of the cabin air compressor mounting hole circle radius to a length defined between the lower slotted holes and the upper slotted hole is between 5.93 and 6.25.

9. The cabin air compressor support assembly of claim 8, wherein substantially smooth regions are formed above the upper slotted hole in the cross-support bracket mounting portion and below the lower slotted holes in the cross-support bracket mounting portion, and a ratio of the cabin air compressor mounting hole circle radius to a length above the upper slotted hole of the substantially smooth regions is at most 8.375:0.975.

10. The cabin air compressor support assembly of claim 8, wherein a ratio of the cabin air compressor mounting hole circle radius to a diameter of each of the cabin air compressor mounting holes is between 20 and 21.23.

11. The cabin air compressor support assembly of claim 8, wherein the cabin air compressor mounting holes further comprise a first cabin air compressor mounting hole, a second cabin air compressor mounting hole, and a third cabin air compressor mounting hole, and the cabin air compressor mounting portion further comprises a curved edge proximate the cabin air compressor mounting holes, a first angled edge proximate the third cabin air compressor mounting hole and formed between the curved edge and an outer edge of the cabin air compressor mounting portion, a lower edge substantially normal to the outer edge, and a second angled edge proximate to the first cabin air compressor mounting hole and formed between the lower edge and the curved edge.

12. The cabin air compressor support assembly of claim 11, wherein a ratio of an angle defined between the first cabin air compressor mounting hole and the third cabin air compressor mounting hole at the cabin air compressor mounting hole circle radius to an angle defined between the lower edge and the second angled edge is between 2.46 and 2.65.

13. The cabin air compressor support assembly of claim 11, wherein a centerline is defined through the first cabin air compressor mounting hole, a datum is defined on a cabin air compressor side of the cabin air compressor mounting portion, and a ratio of a length from the centerline at the datum to a central axis of a coupling hole of the upper lug relative to the cabin air compressor mounting hole circle radius is between 1.618 and 1.632.

14. The cabin air compressor support assembly of claim 13, wherein a ratio of the cabin air compressor mounting hole circle radius to a length defined from a projection normal to the centerline at the datum to the upper lug portion is between 1.558 and 1.588.

15. A method of installing a support bracket in a cabin air conditioning and temperature control system comprising:
coupling an upper lug of the support bracket to a mount of the cabin air conditioning and temperature control system;
coupling a cabin air compressor mounting portion of the support bracket to a cabin air compressor assembly of the cabin air conditioning and temperature control system; and
coupling a cross-support bracket mounting portion of the support bracket to a cross-support bracket, the support bracket comprising:
the cabin air compressor mounting portion formed substantially orthogonal to an access portion and a structural support portion;
the cross-support bracket mounting portion formed at an angle relative to the access portion;
an upper lug portion formed at an angle relative to the access portion and substantially orthogonal to the upper lug;
a plurality of cabin air compressor mounting holes in the cabin air compressor mounting portion, the cabin air compressor mounting holes distributed in an arc configuration along a cabin air compressor mounting hole circle radius; and
a plurality of lower slotted holes and an upper slotted hole in the cross-support bracket mounting portion, wherein a ratio of the cabin air compressor mounting hole circle radius to a length defined between the lower slotted holes and the upper slotted hole is between 5.93 and 6.25.

16. The method of claim 15, wherein the support bracket is a left-hand support bracket, and the method further comprises:
coupling the cross-support bracket to a second support bracket that is coupled to the cabin air compressor assembly and a second mount of the cabin air conditioning and temperature control system.

\* \* \* \* \*